Figure 1:
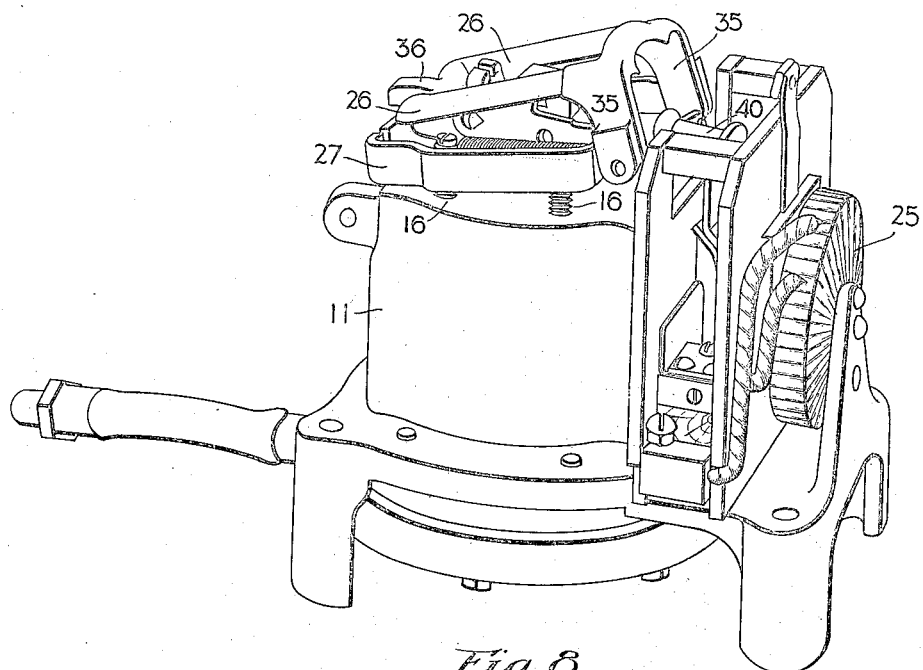
Figure 1:
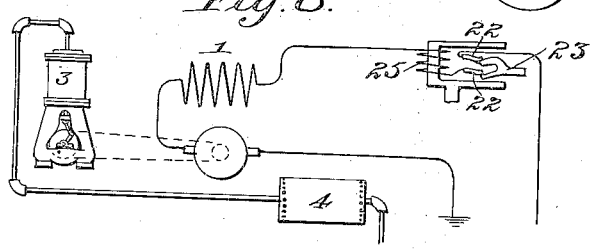

No. 826,341. PATENTED JULY 17, 1906.
G. MACLOSKIE.
FLUID PRESSURE GOVERNOR.
APPLICATION FILED JAN. 9, 1904.

3 SHEETS—SHEET 1.

Witnesses:
Harry N. Tilden
Allen A. Ford

Inventor.
George Macloskie.
by Allen A. G. Davis
Att'y

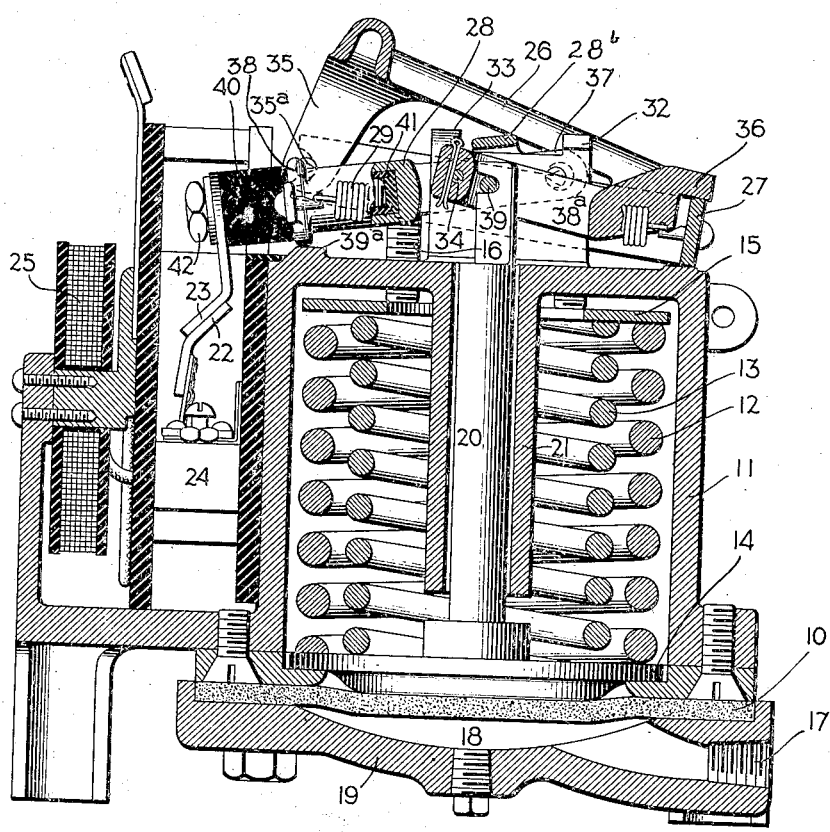

No. 826,341. PATENTED JULY 17, 1906.
G. MACLOSKIE.
FLUID PRESSURE GOVERNOR.
APPLICATION FILED JAN. 9, 1904.
3 SHEETS—SHEET 3.
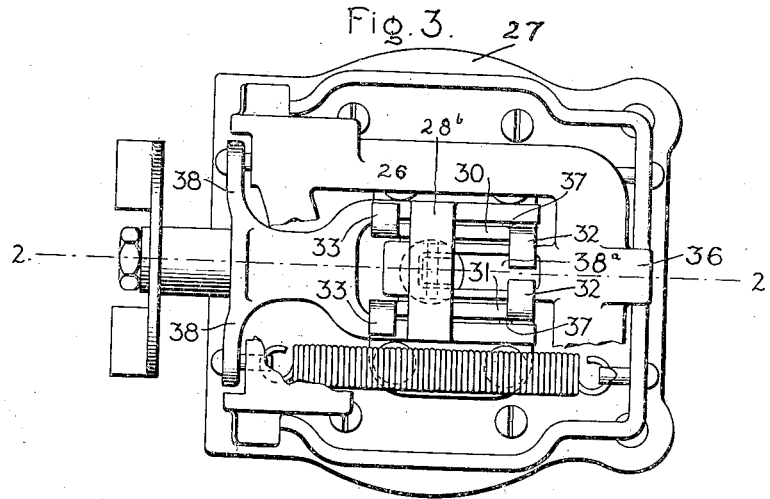
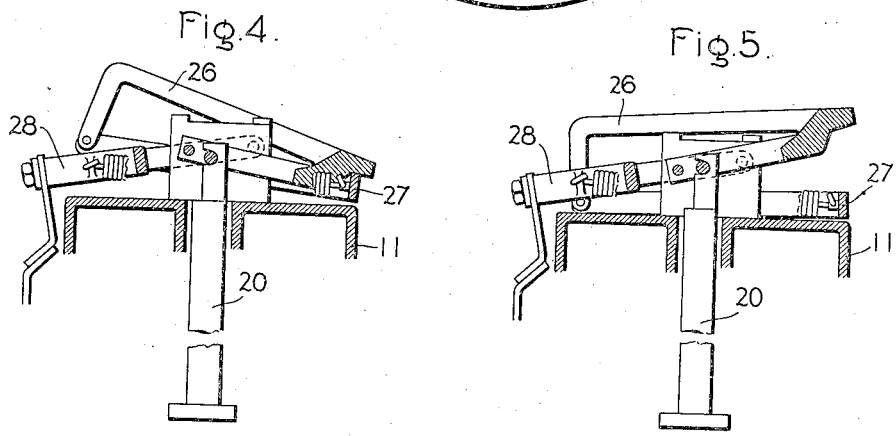
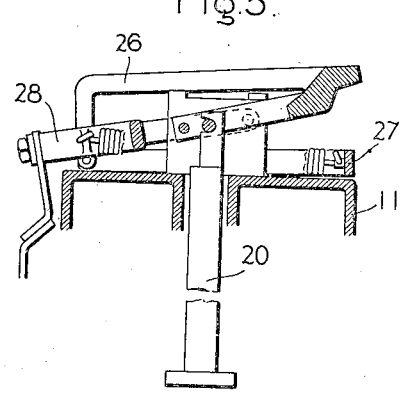
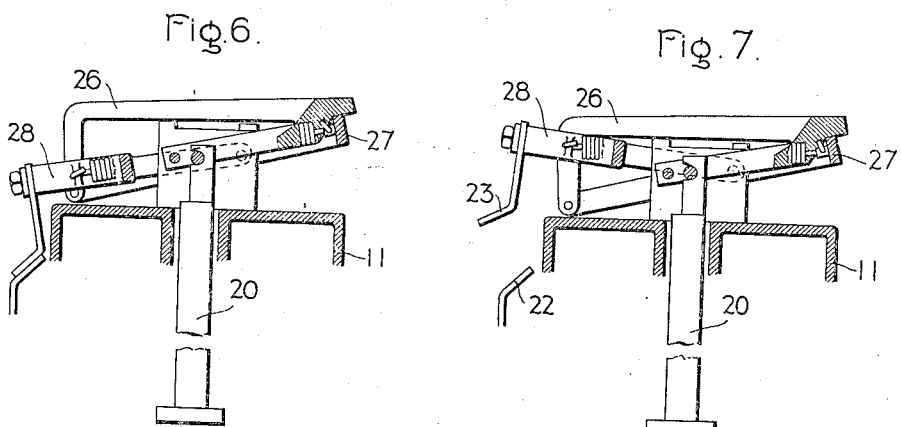
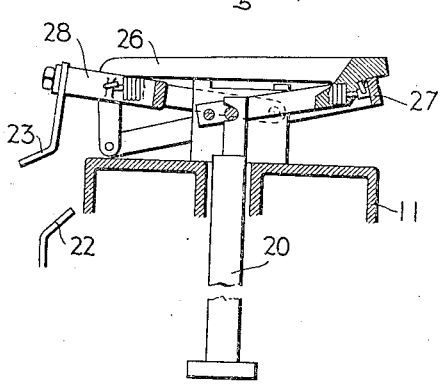
Witnesses
Harry H. Tilden
Helen Orford
Inventor
George Macloskie
by Albert G. Davis
Att'y

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

FLUID-PRESSURE GOVERNOR.

No. 826,341.     Specification of Letters Patent.     Patented July 17, 1906.

Application filed January 9, 1904. Serial No. 188,330.

*To all whom it may concern:*

Be it known that I, GEORGE MACLOSKIE, a citizen of the United States, residing at Schenectady, county of Schenectady, State of New York, have invented certain new and useful Improvements in Fluid-Pressure Governors, of which the following is a specification.

My invention relates to automatic governors such as are employed in fluid-pressure systems to maintain a practically uniform pressure in the sytem. In such systems the fluid is compressed by a compressor actuated by an electric motor and is maintained in a stored-up condition at practically uniform pressure through the agency of the governor, which is so constructed and arranged that by its action when the pressure in the system falls below a predetermined point the motor is automatically cut into circuit to drive the compressor and when a predetermined pressure is reached the motor is automatically cut out and the compressor is stopped. Various governing devices have been proposed for this purpose; but the subject of the present application belongs to the type disclosed in Patent No. 745,683, granted December 1, 1903, on an application filed by Samuel B. Stewart, Jr. One of the distinguishing features of this type consists in having the arm which carries the movable contact connected to a strained spring, acting under either tension or compression, which may be carried on opposite sides of the pivotal point of the arm through the agency of a diaphragm or other means subjected to fluid-pressure. In governors of this type heretofore proposed the construction is such that the movements of the spring and diaphragm are substantially simultaneous. In the act of breaking the motor-circuit this simultaneous movement causes the pressure between the controller-contacts to fall off some time before the actual break takes place. This is a serious objection, since it causes destructive pitting and fusing of the contacts.

The principal object of the present invention is to provide a governor of this type in which when breaking the circuit the pressure between the contacts of the controlling-switch will be maintained substantially uniform throughout practically the entire range of movement of the diaphragm. This is accomplished specifically by providing mechanism which will at first take up the movement of the diaphragm without changing the position of the tension-spring and will cause the spring to move to a position to open the controlling-switch.

In another aspect my invention consists in a novel form of operating mechanism for giving a snap action to a switch-arm which is applicable to switches generally.

Other objects and advantages of my invention will be apparent from the following detailed description, taken in connection with the accompanying drawings.

In the accompanying drawings, Figure 1 is a perspective view of a governor embodying the features of my invention. Fig. 2 is a vertical section of said governor, taken on the line 2 2 of Fig. 3. Fig. 3 is a plan view of the upper portion of said governor. Figs. 4, 5, 6, and 7 are diagrammatic views illustrating different steps in the operation of the governor, and Fig. 8 is a diagram showing the governor arranged in a fluid-pressure system.

Like characters refer to like parts throughout the several views.

The general arrangement of the diaphragm, spring-casing, arc-chute, and blow-out coil are substantially the same as those shown in the patent to Stewart previously referred to, and therefore need be described only in a general way. A diaphragm 10 is located at the lower end of the cylindrical casing 11, which contains the coiled springs 12 and 13, which bear between the upper surface of the plate 14 and the lower surface of the plate 15. The action of these springs is to force the plate 14 down against the diaphragm 10 to neutralize the air-pressure on its under surface. Adjusting-screws 16 16 extend down through the upper end of the casing 11 into engagement with the plate 15 for the purpose of adjusting the tension of the springs 12 and 13. The spring 13 is considerably lighter than spring 12 and is used with it for the purpose of preventing a too rapid increase of spring-pressure as the diaphragm is moved upward. Compressed air is admitted to the under face of the diaphragm 10 through a suitable connection 17, communicating with the cavity 18 in the upper face of the cap 19, which is secured to the under side of the casing 11. The plate 14 is provided with a stem 20, which extends up through a central sleeve 21, formed integral with the body of the casing 11. Fixed contacts 22 22 and a movable contact 23, adapted to bridge said fixed contacts to close the motor-circuit, are located in an arc-chute 24, situated at one side of the casing 11 and provided with walls of fiber or other insulating fire-resisting material. A blow-out coil 25 is located adjacent to said chute and furnishes the necessary field for extinguishing the arc formed between the contacts when the circuit is broken. As previously indicated, the construction thus far described is substantially the same as that shown in the Stewart patent.

The means for transmitting motion from the stem 20 to the movable contact 23 in response to movements of the diaphragm 10 consists, essentially, of a rock-lever 26 and intermediate lever 27, contact-arm 28, and springs 29 29. Two supporting-plates 30 and 31, provided with inwardly-projecting stops 32 32 and outwardly-projecting stops 33 33, extend upward from the casing 11 on opposite sides of the stem 20. The rock-lever 26 is pivoted between these plates at the point 34 adjacent to the stops 33 33 and extends toward the right beneath the stops 32 32, and thence to the left beyond its point of support and on the outside of the plates 30 31 and terminates in two downward projections 35 35. The lower ends of these projections are provided with knife-edges 35$^a$, which serve as pivotal supports for the U-shaped intermediate lever 27, which extends beyond the plates 30 31 into a position to be engaged by the stop 36 on the rock-lever 26. The contact-carrying arm 28, which is bifurcated at its inner end, so as to pass just outside the plates 30 31, is pivoted to said plates at the points 37 37. The opposite end of said arm is provided with lateral projections 38 38. The bifurcated portions of the arm 28 are connected by a bar 28$^b$, which is adapted to be engaged by the upper end of the stem 20 to positively force the arm 28 upward in case the contacts stick. The arm 28 is limited in its upward movement by engaging the stops 33 33 and in its downward movement by the boss 39$^a$ upon the upper side of the casing 11. The upward and downward movements of the rock-lever 26 are in turn limited by the stops 32 32 and the intermediate lever 37 in the manner clearly shown by the position of the parts in Figs. 5 and 4, respectively. The springs 29 connect the outer ends of the lateral projections 38 38 on the switch-arm 28 and the central portion of the U-shaped intermediate lever 27 and being under strain serve to hold said members either in the position illustrated in Fig. 4 or in that illustrated in Fig. 7. The switch-arm 28 and the intermediate lever 27, in fact, constitute two pivoted members, which have a limited movement and are adapted to be held in either limiting position by a strained spring and whose movement to the opposite limiting position is produced by moving the pivot of one of said members beyond the center line of the spring. The portion of the rock-lever 26 adjacent to the pivot 34 is provided with a vertical opening 38$^a$, which is adapted to receive the upper end of the stem 20. This stem is provided with a suitable recess, which engages a pin 39, which bridges the opening 38, thus forming a pivotal connection between the stem and the rock-lever. The movable contact 23, located at the outer end of the arm 28, is insulated from the main portion of the arm by the ring of insulating material 40, which forms a washer between said contact and the body of the lever, and suitable insulation 41, into which the screw 42 is passed to firmly secure the contact 23 in place.

In the operation of this mechanism, assuming that the motor-circuit is closed and the parts are in the position shown in Figs. 2 and 4, as soon as the air-pressure beneath the diaphragm 10 begins to rise the stem 20 is moved upward so as to rock the lever 26 about its pivot 34. This movement of the rock-lever continues throughout practically the entire range of movement of the diaphragm 10 and stem 20. When the stem has about reached its upper limit, the knife-edges 35$^a$, which constitute the pivotal bearing of the intermediate lever 27, pass below the center line of the spring 29, thus leaving the spring in a position to draw the intermediate lever upward from its position, as shown in Fig. 5, against the stop 26 of the rock-lever 36, as illustrated in Fig. 6. This movement of the intermediate lever 27 brings the center line of the spring 29 above the pivot 37, thus bringing the spring into a position to draw the switch-arm 28 upward into the position shown in Fig. 7, thereby separating the contacts 22 and 23 and breaking the motor-circuit. In closing the circuit the parts are moved from the position illustrated in Fig. 7 to that shown in Fig. 4. In this operation as soon as the pressure beneath the diaphragm 10 falls off the springs 12 and 13, acting on the upper side of the plate 14, force it with its stem 20 downward, so as to rock the lever 26 about its pivot 34. This movement of the lever 26 carries the pivotal point of the intermediate lever 27 upward and the opposite end of said lever downward until the center line of the springs 29 passes below the pivot 37. As soon as this point is reached, the contact-arm 28 is drawn down by the spring so as to close the motor-circuit between the contacts 22 22. From this description it will be apparent that in the act of breaking the motor-circuit the position of the springs 29 remains unchanged throughout practically the entire movement of the diaphragm 10, thus maintaining a constant pressure between the contacts 22 and 23, and that the movement which is effective in changing the position of the spring so as to break the circuit takes place almost instantaneously.

In Fig. 8 I have shown a motor 1, driving a compressor 3, which supplies air to a reservoir 4. It will be seen that when the contacts 22 and 23 are in engagement with each other the motor-circuit is complete, this being the condition illustrated in the diagram. When, however, contacts 23 leave contacts 22, the motor-circuit is interrupted and the motor and compressor come to rest.

It should be noted that the mechanism I have devised for operating the switch-arm is capable of general application to switches and should not be limited to those which are pneumatically operated and that many modifications and alterations may be made in the specific form illustrated, and I therefore do not wish to be limited to such specific construction, but aim to cover by the terms of the appended claims all modifications and alterations which rightly fall within the scope of my invention.

What I claim as new, and desire to secure by Letters Patent of the United States, is—

1. In a switch mechanism, the combination of switch-contacts, a strained spring for maintaining a definite pressure between said contacts, a movable member, and means for transmitting motion from said member to said contacts by initially taking up the movement of said member without decreasing the pressure between said contacts and subsequently moving said spring to a position to separate said contacts.

2. In a fluid-pressure governor, the combination of a pressure-diaphragm, a switch-arm, a strained spring tending to hold said arm in a definite position, and means for transmitting motion from said diaphragm to said arm by initially taking up the movement of said diaphragm without changing the position of said spring and subsequently moving said spring to a position to move said arm from its initial position.

3. In a switch mechanism, the combination of a pivoted switch-arm having a limited movement, a strained spring tending to hold said arm in either limiting position, a movable member, and motion-transmitting means operated by the movement of said member in one direction to initially take up said movement without changing the position of said spring and subsequently to move said spring to a position to move said switch-arm and by the movement of said member in the opposite direction to move said spring to a position to return said switch-arm.

4. In a switch mechanism, the combination of two pivoted members having a limited movement, a strained spring tending to hold said members in either limiting position, and means for moving the pivot of one of said members to one side of the center line of said spring to operate said members successively.

5. In a switch mechanism, the combination of a pivoted switch-arm and a pivoted lever, each having a limited movement, a strained spring tending to hold said arm and lever in either limiting position, and means for moving the pivot of said lever to one side of the center line of said spring to operate said lever and arm successively.

6. In a switch mechanism, the combination of a pivoted switch-arm and a pivoted intermediate lever, each having a limited movement, a strained spring tending to hold said arm and intermediate lever in either limiting position, a rock-lever for moving the pivot of said intermediate lever to one side of the center line of said spring to operate said intermediate lever and said arm successively, and means for operating said rock-lever.

7. In a fluid-pressure governor, the combination of a fixed contact, a movable contact, a pivoted arm carrying said movable contact, a pivoted intermediate lever, said arm and lever each having a limited movement, a strained spring tending to hold said arm and intermediate lever in either limiting position, a rock-lever for moving the pivot of said intermediate lever to one side of the center line of said spring to operate said intermediate lever and said arm successively, and a pressure-diaphragm operatively connected to said rock-lever.

8. In a switch mechanism, the combination of a pivoted switch-arm and a pivoted intermediate lever, each having a limited movement, a strained spring for holding said arm and lever in either limiting position, a rock-lever for moving the pivot of said intermediate lever to one side of the center line of said spring to cause said intermediate lever to rock about its pivot, a stop on said rock-lever for engaging said intermediate lever when the center line of the spring passes beyond the pivot of the switch-arm into a position to move said switch-arm to its other limiting position.

9. In a switch mechanism, the combination of a casing, a rock-lever pivoted to said casing and extending on opposite sides of the pivot, an intermediate lever pivoted to one end of said rock-lever and extending toward its opposite end, a switch-arm pivoted to said casing and extending from its pivot in a direction opposite to that of said intermediate lever, a strained spring connecting the non-adjacent ends of said switch-arm and said intermediate lever, and means for moving said rock-lever.

10. In a platform-governor, the combination of an abutment subjected to opposing spring and air pressures, a casing, a stem connected to said abutment and extending up through said casing, a rock-lever pivotally connected to the upper end of said stem and said casing and extending on opposite sides of said pivotal points, an intermediate lever pivoted to one end of said rock-lever and extending toward its opposite end, a switch-arm pivoted to said casing and extending from its pivot in a direction opposite to that of said intermediate lever, and a strained spring connecting the non-adjacent ends of said spring-arm and said intermediate lever.

In witness whereof I have hereunto set my hand this 8th day of January, 1904.

GEORGE MACLOSKIE.

Witnesses:
BENJAMIN B. HULL,
HELEN ORFORD.